Sept. 20, 1966 R. B. HANSEN ETAL 3,274,334
HUE CONTROL CIRCUITS FOR COLOR TELEVISION RECEIVERS
Filed Oct. 28, 1963
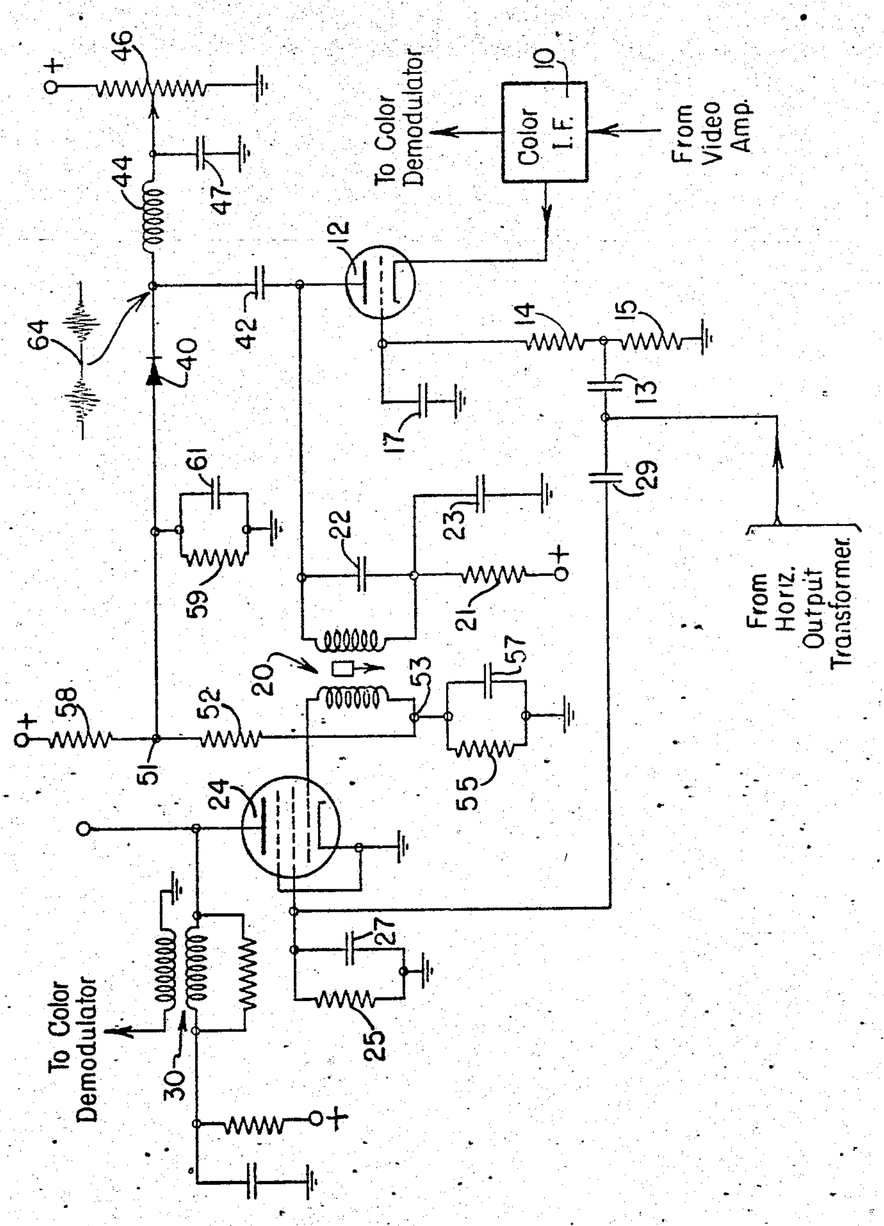
INVENTORS
Robert B. Hansen
BY Henry C. Waldschmidt
Mueller & Aichele
Attys.

United States Patent Office 3,274,334

Patented Sept. 20, 1966

3,274,334

HUE CONTROL CIRCUITS FOR COLOR TELEVISION RECEIVERS

Robert B. Hansen, Arlington Heights, and Henry C. Waldschmidt, Matteson, Ill., assignors to Motorola, Inc., Chicago, Ill., a corporation of Illinois Filed Oct. 28, 1963, Ser. No. 319,471
7 Claims. (Cl. 178—5.4)

This invention relates generally to color television receivers and more particularly to an improved circuit for adjusting the hue of the reproduced color image.

The standard composite color signal includes blanking and synchronizing components, color intensity components which are combined in proper proportions for monochromatic reception, and a chroma signal for use in receivers designed for color reception. The chroma signal in turn is comprised of color subcarrier sideband components which are phase and amplitude modulated with distinct chroma information and a color burst reference signal which is used for synchronous demodulation of the color subcarrier at the receiver.

The color burst reference signal is maintained in precise phase relationship with the color subcarrier to insure proper hue of the reproduced color image after the demodulation process. However, a phase shift may occur during transmission of the composite color signal or be introduced by fine tuning adjust at the receiver, or the viewer may desire a different hue of the reproduced image according to personal taste. It is therefore desirable to provide a simple manual adjustment on the front panel of the receiver to vary the hue of the reproduced image.

Hue adjustment may be accomplished by slightly shifting the phase of the color burst reference signal. This can be achieved by utilizing a variable impedance element in conjunction with a tuned circuit associated with the color burst separator portion of the receiver. However, it is desirable to provide circuit isolation between the panel located adjustment and the color burst separator, and to provide an adjustment arrangement which does not require expensive and complicated mechanical coupling provisions. For example, a potentiometer adapted to vary the level of a D.C. voltage will provide a simple, inexpensive adjustment which may be conveniently located on the front panel of the receiver and which may be readily isolated from the high frequency signals occurring in the color burst separator portion of the receiver.

It is accordingly an object of the invention to provide an improved circuit for adjustment of the hue of the reproduced image of the color television receiver.

Another object is to provide a hue adjustment circuit for the reproduced image of color television receivers which is insensitive to amplitude changes of the color burst reference signal.

A further object is to provide a simple and economical hue adjustment circuit for color television receivers which may be conveniently located on the front panel of the receiver.

Still another object of the invention is to provide an improved hue adjustment circuit for color television receivers which automatically compensates for hue variations therein that may arise from amplitude changes of the color burst reference signal.

A feature of the invention is the provision of a phase shift network including a biased diode in series with a capacitor coupled across a tuned circuit carrying the color burst signal of a color television receiver, with adjustment of the biasing voltage applied to the diode producing a phase shift in the color burst reference signal to change the hue of the reproduced image. A compensating circuit provides an additional bias for the diode in response to the level of the color burst reference signal to maintain the hue and its range of adjustment constant with variations in amplitude of the color burst reference signal.

Another feature is the provision of a biased diode and a capacitor in series therewith coupled to a tuned circuit carrying the color burst reference signal of a color television receiver, with a potentiometer varying a D.C. voltage applied to one side of the diode to produce a phase shift and hence hue adjustment for the reproduced color image. A second D.C. voltage is applied to the other side of the diode and includes a component that is proportional to the amplitude of the color burst reference signal to stabilize the hue of the reproduced image against variations in amplitude of the color burst reference signal.

A further feature of the invention, in a hue adjustment circuit of the above described type, is the provision of a circuit arrangement to produce a compensating voltage proportional to the amplitude of the color burst reference signal and of a polarity with respect to a predetermined hue control biasing voltage to maintain diode conduction constant with changes in amplitude of the color burst reference signal.

Still another feature is the provision of a hue adjustment circuit of the type described having a potentiometer for supplying a variable bias voltage to one side of the diode of the phase shifting network and a resistor for supplying fixed bias voltage to the other side of the diode to insure a full adjustment range in the presence of strong color burst signals and to enhance diode conductance at very low color burst reference signals.

A more specific feature of the invention, in a color television receiver having first and second gated burst separator tubes and a resonant circuit tuned to the color burst reference signal coupled therebetween, and having a phase shifting network including biased diode in series with a capacitor coupled across the tuned circuit for producing an adjustable phase shift for hue control, is the provision of a compensating circuit including the grid leak resistor of one of the tubes for developing a voltage proportional to the level of the color burst reference signal. The voltage so developed modifies the diode bias to maintain constant conduction over a range of levels of color burst reference signals to prevent variations of the hue of the reproduced image.

Other objects, features and attending advantages of the invention will become apparent from the following description when taken in conjunction with the accompanying drawing, which is a schematic diagram of an embodiment of the invention.

In practicing the invention a diode and a capacitor in series therewith are coupled across a resonant circuit tuned to carry the color burst reference signal that has been derived from the chroma signals appearing in a color television receiver. Conveniently this resonant circuit may be included in the interstage coupling between the gating and the amplifying sections of the color burst separator of the receiver. An adjustable D.C. biasing voltage obtained from a potentiometer is applied to one side of the diode, and changing the setting of the potentiometer changes the effective resistance of the diode resulting in a phase shift in the color burst reference signal carried by the resonant circuit.

A second fixed D.C. biasing voltage of the same polarity is applied through a resistor to the other side of the diode. Superimposed upon this fixed biasing voltage is a variable D.C. voltage of opposite polarity and proportional to the magnitude of the amplitude of the color burst reference signal. This superimposed voltage compensates for changes in diode conduction resulting from amplitude changes of the color burst reference signal and maintains a constant hue of the reproduced image for a given setting of the adjustment potentiometer. The fixed bias, in addition, stabilizes conduction of the diode in the presence of very strong color burst reference signals and very weak color burst reference signals to allow the hue adjustment potentiometer to maintain effective control over its entire range.

Referring now specifically to the accompanying drawing, there is shown a circuit illustrating the manner in which the invention may be carried out. A portion of the chroma signal, which includes color subcarrier sideband components and the color burst reference signal, is supplied to the cathode of triode 12. This chroma signal may, for example, be derived from a color IF stage 10 of the receiver. Color IF stage 10 also translates the chroma signal to the input of the color demodulator (not shown). A series of positive going gating pulses are coupled through capacitor 13 to the juncture point of grid resistors 14 and 15 of triode 12. These gating pulses occur in time coincidence with the horizontal blanking interval of the detected composite video signal and may conveniently be horizontal retrace pulses derived from the horizontal output transformer of the line sweep system of the receiver in a known manner. Resistors 14 and 15, in conjunction with capacitor 17, form a self-biasing circuit for triode 12 to hold it in a cutoff condition between gating pulses. The positive going gating pulses periodically drive triode 12 into conduction when color burst reference signals are present in the chroma signal applied to its cathode. Accordingly, color bursts, which contain several cycles of 3.58 megacycle oscillations, are developed across the primary of coupling transformer 20. Capacitor 22 is connected across the primary coupling transformer 20 to provide a resonant circuit tuned to the 3.58 megacycle color burst signal. Capacitor 23 returns one side of the resonant circuit so provided to ground reference potential. Anode voltage is supplied to triode 12 through resistor 21.

The secondary of transformer 20 supplies the color burst reference signal to the grid of pentode 24, which functions as a gated amplifier for the color burst reference signal. To this end, the screen grid of pentode 24 is returned to ground through a biasing network including resistor 25 and capacitor 27. The positive going pulses derived from the horizontal output of the receiver for gating of triode 12 are also coupled through capacitor 29 to the screen grid of pentode 24. This drives pentode 24 into conduction in time coincidence with triode 12 so that there is double gating as well as amplification of the color burst reference signal. The double gating action insures that there is no feedthrough of color subcarrier sideband components to the output of pentode 24.

The amplified color burst reference signal appearing at the anode of pentode 24 is supplied to the primary winding of transformer 30. The secondary winding of transformer 30 couples the color burst reference signal to the color demodulator to provide a reference for synchronous demodulation of the color subcarrier sideband components. Circuits of this type and the manner in which they provide color difference signals for color image reproduction are known in the art and form no part of the invention.

The cathode end of diode 40, which diode may be a crystal or semiconductor diode, is coupled by capacitor 42 to the anode of triode 12. The junction between the cathode of diode 40 and capacitor 42 is further connected to the center arm of potentiometer 46. The ends of potentiometer 46 are connected between a positive voltage source and ground reference potential. Capacitor 47 bypasses the center arm of potentiometer 46 to ground reference potential.

The anode of diode 40 is connected by resistor 52 to point 53 on the bottom side of the secondary or transformer 20. This point is further returned to ground reference potential by an RC network including resistor 55 and capacitor 57. The junction point 51 between the anode of diode 40 and resistor 52 is also returned to a positive potential source by resistor 58. Point 51 is further returned to ground reference potential by the RC network including resistor 59 and capacitor 61.

The color burst reference signal appearing at the anode of triode 12 as a result of its gating action is coupled through capacitor 42 to the cathode of diode 40. This signal appears in the form of bursts of several cycles of 3.58 megacycle oscillations, as shown by waveform 64. A positive bias is applied through choke coil 44 to the cathode of diode 40 from the center arm of potentiometer 46. The level of the bias applied to the cathode of diode 40 can be set by adjustment of the center arm of potentiometer 46. Another fixed positive bias is applied to the anode of diode 40 from a positive supply through resistor 58. The A.C. path provided for the 3.58 megacycle oscillations is from the anode of triode 12 through capacitor 42 and diode 40, and back through capacitor 61 to ground reference potential. With this biasing arrangement diode 40 tends to become more conductive during the negative half cycles of the oscillations of the color burst reference signal 64, with the amount of conduction for a given negative swing established by the net bias appearing across diode 40. Changing the adjustment of the center arm of potentiometer 46 changes the net bias across diode 40 and hence its conduction when color burst reference signals are coupled to it by capacitor 42.

The average effective resistance of diode 40 is determined by its conduction. Since this effective resistance is in series with capacitor 42, a complex impedance is developed across tuned coupling transformer 20 which carries the 3.58 megacycle oscillations of the color burst reference signal between triode 12 and pentode 24. Changing the resistive component of the complex impedance provided by the series combination of diode 40 and capacitor 42 results in a phase shift of the color burst reference signal coupled through transformer 20. Thus, changing the position of the center arm of potentiometer 46, and hence the average resistance of diode 40 when 3.58 megacycle oscillations are coupled to its cathode, provides a phase shift for the color burst reference signal.

It is apparent from the foregoing that for a fixed bias across diode 40 its conduction and hence the phase shift will also vary with the amplitude of the color burst reference signal. Stated another way, a greater negative swing of the oscillations of waveform 64 will tend to make diode 40 more conductive, changing its average resistance a proportionate amount. However, positive half cycles of the oscillations coupled to pentode 24 result in grid current to produce a voltage drop across resistor 55. This develops a negative voltage across the RC network of resistor 55 and capacitor 57 at point 53. The magnitude of this negative voltage is proportional to the amplitude of the color burst reference signal coupled through transformer 20 to pentode 24. Since point 53 is connected to point 51 by resistor 52, the voltage at the anode of diode 40 tends to become negative by a corresponding amount. As the amplitude of the color burst reference signal increases, the negative voltage supplied to point 51 from point 53 increases, with the converse occuring as the amplitude of the color burst reference signal decreases. As a result, the net bias across diode 40 changes in proportion to the level of the color burst signal and in a direction to compensate for changes in conduction arising from the changes in the amplitude of the oscillations of the color burst reference signal coupled to the cathode of diode 40. Thus, conduction of diode 40 remains constant for varying levels of the color burst signal, and may be established solely by the setting of potentiometer 46.

When strong signals are present, a large negative voltage is supplied to point 51 from point 53, and tends to mask the control achieved by potentiometer 46 by limiting its effective range. However, by also returning point 51 to a positive potential through resistor 58, the anode of diode 40 is maintained sufficiently positive in the presence of very strong signals so that a full range of potentiometer control is maintained. And in the presence of very weak signals, insufficient to drive diode 40 into complete conduction and with no compensating voltage developed at point 53, the positive voltage supplied to point 51 tend to maintain diode 40 conductive. Thus returning the anode of diode 40 to a positive potential through resistor 58 also prevents loss of control by potentiometer 46 in the presence of very weak signals.

In a practical circuit constructed according to the invention, the following circuit elements may be used:

| | |
|---|---|
| Triode 12 | ½XCF80/4BL8. |
| Pentode 28 | ½XCF80/4BL8. |
| Diode 40 | E902 (Motorola). |
| Capacitor 42 | 56 pf. |
| Choke 44 | Antiresonant at 3.58 megacycles. |
| Potentiometer 46 | 10,000 ohms. |
| Capacitors 47, 61 | .01 mf. |
| Resistor 52 | 390,000 ohms. |
| Resistor 55 | 330,000 ohms. |
| Capacitor 57 | .001 mf. |
| Resistor 58 | 3.3 megohms. |
| Resistor 59 | 680,000 ohms. |

Hue control potentiometer 46 may be located any convenient place on the television receiver, such as on the front panel. Choke 44 provides a high impedance to the color burst reference signal and capacitor 47 provides a bypass to ground, insuring complete circuit isolation for the potentiometer. Thus interconnecting leads for potentiometer 46 carry D.C. only and present no problems of lead length and radiation. In addition, no complicated mechanical coupling arrangement is needed to provide the phase shift for the color burst reference signal required for hue control.

Although one embodiment of the invention is set forth with particularity, it is apparent from the foregoing that certain modifications may be made by those skilled in the art. The series combination of diode 40 and capacitor 42 may be coupled across other tuned circuits carrying the 3.58 megacycle color burst signal, or to the particular circuit shown in a different manner. For example, capacitor 42 may be connected to the grid of pentode 24 rather than the plate of triode 12 to effectively provide a phase shift network across the secondary of transformer 20, which is also tuned by capacitor 22. And the compensating voltage that is proportional to signal levels and applied to the anode of diode 40 at point 51 may be derived from other points in the receiver, although as shown a particularly simple and convenient circuit is provided. The polarity of diode 40 may be reversed so that it tends to conduct on positive half cycles of the color burst reference signal. In this instance the compensating voltage proportional to the signal level would be of opposite polarity to that described, and the relative polarities of the biasing voltages for diode 40 changed accordingly.

The invention provides, therefore, an improved hue control circuit arrangement for color television receivers. It is simple and economical to construct and stabilizes hue control adjustment against changes in fine tuning and other causes of color burst reference signal amplitude variations. The circuit also allows for the full range of the control potentiometer to be utilized in the presence of extremely strong or weak signals. The control potentiometer is isolated from the 3.58 megacycle color burst signal, and may be located on the front panel of the receiver for ease of hue adjustment. Control is achieved by changing a D.C. biasing voltage level only so that complicated mechanical coupling is not needed, and the D.C. biasing voltage is completely isolated from the color burst reference signal.

We claim:

1. In a color television receiver for reproducing a color image in response to a received composite color television signal, which signal includes a chroma signal having color subcarrier sideband components and a color burst reference signal, said receiver including a color demodulator and a color burst separator for deriving a color burst signal from said chroma signal, said color burst separator including signal translating circuit means having a resonant circuit tuned to the frequency of said color burst reference signal for supplying same to said color demodulator, the combination including, a phase shifting network for shifting the phase of the color burst reference signal appearing across said resonant circuit, said phase shifting network including a diode and a capacitor connected in series and coupled across said resonant circuit, means for applying a fixed bias voltage to one side of said diode, and means for applying a variable bias voltage to the other side of said diode, said diode presenting a variable resistance in series with said capacitor to shift the phase of said color burst reference signal, said phase shift being determined by the conduction of said diode as established by the difference between said fixed bias voltage and said variable bias voltage, whereby said variable bias voltage provides hue control for said reproduced image.

2. In a color television receiver for reproducing a color image in response to a received composite color television signal, which signal includes a chroma signal having color subcarrier sideband components and a color burst reference signal, said receiver including color demodulation means and color burst separator means for deriving said color burst reference signal from said composite color television signal, said color burst separator means including signal translation means having a resonant circuit tuned to the frequency of said color burst reference signal for supplying said color burst reference signal to said color demodulation means, the combination including means for shifting the phase of said color burst reference signal appearing across said resonant circuit, said phase shifting means including a capacitor and a diode connected in series, means for establishing a predetermined bias voltage across said diode, means for applying said color burst reference signal to said phase shifting means, said diode presenting a variable resistance in series with said capacitor to shift the phase of said color burst reference signal, said phase shift being determined by said predetermined bias voltage and by the amplitude of said color burst reference signal applied to said phase shifting means, and means responsive to the amplitude of said color burst reference signals for varying the bias voltage established across said diode so that said phase shift is substantially independent of amplitude variations of said color burst reference signal, whereby said predetermined bias voltage controls the hue of the reproduced color image.

3. In a color television receiver for reproducing a color image in response to a received composite color television signal, which signal includes a chroma signal having color subcarrier sideband components and a color burst reference signal, said receiver including a color demodulator and a color burst separator for deriving said color burst reference signal from said chroma signal, said color burst separator including signal translating means having a resonant circuit tuned to the frequency of said color burst reference signal for supplying same to said color demodulator, a circuit for controlling the hue of said reproduced image including in combination, a phase shifting network for shifting the phase of the color burst reference signal carried by said resonant circuit, said phase shifting network including a diode and a capacitor connected in series, means for applying said color burst reference signal to said phase shifting network, means for applying a variable bias voltage to one side of said diode, means for applying a fixed bias voltage to the other side of said diode, said diode presenting a variable resistance in series with said capacitor to shift the phase of the color burst reference signal carried by said resonant circuit, with said phase shift being determined by the biasing voltages applied to said diode and by the amplitude of said color burst reference signal, and means responsive to amplitude changes of said color burst reference signal for applying a further bias voltage to said other side of said diode, said further bias voltage having a magnitude and polarity to prevent changes in conduction of said diode with changes in amplitude of said color burst reference signal, whereby said variable bias voltage provides a hue control for said reproduced image insensitive to variations of amplitude of said color burst reference signal.

4. In a color television receiver for reproducing a color image in response to a received composite color television signal, which signal includes a chroma signal having color subcarrier sideband components and a color burst reference signal, with said receiver including a color demodulator, the combination including the color burst separator circuit having first and second stages deriving a color burst reference signal from said chroma signal and translating said color burst reference signal to said color demodulator, with a resonant circuit tuned to said color burst reference signal coupled between said first and second stages, a phase shifting network coupled across said resonant circuit for shifting the phase of said color burst reference signal, said phase shift network including a capacitor and a diode connected in series, first biasing means for applying a fixed bias voltage to one side of said diode, second biasing means for applying a variable bias voltage to the other side of said diode, said diode presenting a variable resistance in series with said capacitor to shift the phase of said color burst reference signal appearing across said resonant circuit, said phase shift being determined by the conduction of said diode established by said bias voltages and by the magnitude of said color burst reference signal, and circuit means responsive to amplitude changes of said color burst reference signals for changing said fixed bias voltage, said fixed bias voltage being changed to decrease diode conduction in the presence of a high level color reference signal and to increase diode conduction in the presence of a low level color burst reference signal so that said diode conduction remains constant for a given setting of said second biasing means, whereby said second biasing means provides a hue control for said reproduced image.

5. In a color television receiver for reproducing a color image in response to a received composite color television signal, which signal includes a chroma signal having color subcarrier sideband components and a color burst reference signal, the combination including a triode stage and a pentode stage for applying said reference signal to said color demodulator, with at least said triode stage being gated by periodic pulses to derive said color burst reference signal from said chroma signal, a tuned circuit for translating said color burst reference signal between said triode stage and said pentode stage, a phase shift network comprising a diode connected in series with a capacitor coupled across said tuned circuit, first bias circuit means for applying an adjustable bias voltage of a given polarity to one side of said diode, second bias circuit means for applying a fixed bias voltage of the same said polarity to the other side of said diode, said phase shift being determined by the conduction of said diodes as established by said first and second bias circuit means and by the amplitude of said color burst reference signal, circuit means for deriving a third bias voltage proportional to the lever of said color burst reference signal from said pentode stage, said third biasing voltage being of opposite polarity from said first and second bias voltages, and means combining said third bias voltage with said second bias voltage to thereby decrease diode conduction for high level color burst reference signals and to increase diode conduction for low level color burst reference signals, whereby adjustment of said first bias voltage provides a hue control insensitive to the level of said color burst reference signal for said reproduced image.

6. In a color television receiver for reproducing a color image in response to a received composite television signal, which signal includes a chroma signal having color subcarrier sideband components and a color burst reference signal, the combination including a color burst separator circuit having first and second stages for deriving a color burst reference signal from said chroma signal and applying same to the color demodulator to said receiver, resonant circuit means for translating said color burst reference signal between said first and second stages, a phase shifting network coupled across said resonant circuit, said phase shifting network comprising a diode and a capacitor connected in series, first biasing means including a potentiometer applying a first positive bias voltage to the cathode of said diode, second biasing means including a resistor applying a second positive bias voltage to the anode of said diode, said diode representing a variable resistance in series with said capacitor to shift the phase of said color burst reference signal translated by said resonant circuit, said phase shift being determined by said bias voltages and by the amplitude of said color burst reference signal, with said potentiometer adapted to vary said first positive bias voltage thereby providing a hue control for said reproduced image, and with said second bias voltage maintaining a full range of control by said potentiometer for strong and weak levels of said color burst reference signal.

7. In a color television receiver for reproducing a color image in response to a received composite color television signal, which signal includes a chroma signal having color subcarrier sideband components and a color burst reference signal, the combination including the color burst separator circuit having first and second stages for deriving said color burst reference signal from said chroma signal and applying same to the color demodulator of said receiver, said second stage including a vacuum tube pentode having a grid leak resistor and a capacitor in shunt therewith, said pentode adapted to be periodically gated into conduction in time coincidence with the occurrence of said color burst reference signal, a resonant circuit for translating said color burst reference signal between said first and second stages, a phase shifting network coupled across said resonant circuit, said phase shifting network comprising a capacitor and a diode connected in series, first biasing means including a potentiometer applying a variable positive bias to the cathode of said diode, second biasing means including a resistor for applying a fixed positive bias to the anode of said diode, said diode presenting a variable resistance in series with said capacitor to shift the phase of said color burst reference signal translated by said resonant circuit, said phase shift being determined by said bias voltages and the amplitude of said color burst reference signal, and circuit means connecting the grid side of said grid leak resistor to the anode of said diode, with a negative voltage developed across said grid leak resistor by conduction of said pentode in the presence of said color burst reference signal being combined with said fixed positive bias to maintain substantially constant diode conduction with variations in amplitude of said color burst reference signal, whereby said potentiometer provides a hue control for said reproduced image insensitive to amplitude variations of said color burst reference signal.

No references cited.

DAVID G. REDINBAUGH, *Primary Examiner.*